(12) United States Patent
Yang et al.

(10) Patent No.: US 9,807,336 B2
(45) Date of Patent: Oct. 31, 2017

(54) DYNAMIC ADJUSTMENT OF VIDEO FRAME SAMPLING RATE

(71) Applicant: MediaTek Inc., Hsinchu (TW)

(72) Inventors: Chun-Chuan Yang, New Taipei (TW); Yi-Lun Lin, Taipei (TW); Chia-Mao Hung, Taipei (TW); Chiung-Fu Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 37 days.

(21) Appl. No.: 14/931,719

(22) Filed: Nov. 3, 2015

(65) Prior Publication Data

US 2016/0057382 A1 Feb. 25, 2016

Related U.S. Application Data

(60) Provisional application No. 62/078,586, filed on Nov. 12, 2014, provisional application No. 62/160,103, filed on May 12, 2015.

(51) Int. Cl.
| | |
|---|---|
| *H04N 5/46* | (2006.01) |
| *H04N 21/4363* | (2011.01) |
| *H04N 21/4402* | (2011.01) |
| *H04N 21/442* | (2011.01) |
| *H04N 21/462* | (2011.01) |
| *H04N 7/01* | (2006.01) |
| *G09G 5/00* | (2006.01) |

(52) U.S. Cl.
CPC ............. *H04N 5/46* (2013.01); *G09G 5/006* (2013.01); *H04N 7/0127* (2013.01); *H04N 21/43637* (2013.01); *H04N 21/44227* (2013.01); *H04N 21/440281* (2013.01); *H04N 21/4621* (2013.01); *G09G 2340/0435* (2013.01); *G09G 2370/10* (2013.01); *G09G 2370/16* (2013.01)

(58) Field of Classification Search
USPC ....... 348/558, 563, 584, 537, 516, 515, 513, 348/665, 739, 725, 835, 479, 405.1, 348/399.1, 342, 290, 224.1, 211.2, 69, 348/14.02; 375/240.01, 240.03
See application file for complete search history.

(56) References Cited

U.S. PATENT DOCUMENTS

| | | | | |
|---|---|---|---|---|
| 5,023,719 A | * | 6/1991 | Zwirn | G06T 1/0007 348/240.2 |
| 5,796,442 A | * | 8/1998 | Gove | G09G 3/20 348/556 |

(Continued)

*Primary Examiner* — Jefferey F Harold
*Assistant Examiner* — Mustafizur Rahman
(74) *Attorney, Agent, or Firm* — Han IP Corporation; Andy M. Han

(57) ABSTRACT

A technique, as well as select implementations thereof, pertaining to dynamic adjustment of video frame sampling rate is described. The technique may involve receiving a first video signal comprising a first plurality of video frames and determining a frame rate of the first plurality of video frames. The technique may also involve adjusting a sampling rate according to the determined frame rate of the first plurality of video frames. The technique may further involve sampling the first plurality of video frames at the adjusted sampling rate. The technique may additionally involve generating a second video signal comprising a second plurality of video frames based on the sampled first plurality of video frames.

35 Claims, 11 Drawing Sheets

(56) References Cited

U.S. PATENT DOCUMENTS

| | | | | |
|---|---|---|---|---|
| 6,108,447 | A * | 8/2000 | Lord | G06T 9/007 345/420 |
| 8,239,888 | B2 * | 8/2012 | Todd | H04N 17/004 725/19 |
| 2002/0021754 | A1 * | 2/2002 | Pian | H04N 19/176 375/240.02 |
| 2002/0090027 | A1 * | 7/2002 | Karczewicz | H04N 21/23406 375/240.01 |
| 2003/0206242 | A1 * | 11/2003 | Choi | G09G 5/006 348/441 |
| 2004/0032350 | A1 * | 2/2004 | Knapp | H04J 3/0647 341/61 |
| 2005/0024532 | A1 * | 2/2005 | Choi | G06T 3/40 348/441 |
| 2005/0248596 | A1 * | 11/2005 | Smith | G09G 5/005 345/698 |
| 2006/0104347 | A1 * | 5/2006 | Callan | H04N 7/15 375/240.01 |
| 2006/0139491 | A1 * | 6/2006 | Baylon | H04N 5/144 348/558 |
| 2006/0256861 | A1 * | 11/2006 | Laksono | H04N 19/176 375/240.03 |
| 2007/0121010 | A1 * | 5/2007 | Sasaki | H04N 5/4401 348/558 |
| 2007/0222799 | A1 * | 9/2007 | Lee | G09G 5/005 345/667 |
| 2009/0213929 | A1 * | 8/2009 | Hasegawa | H04N 19/15 375/240.03 |
| 2010/0020233 | A1 * | 1/2010 | Ueno | G09G 3/3611 348/452 |
| 2010/0278230 | A1 * | 11/2010 | MacInnis | H04N 19/172 375/240.02 |
| 2010/0296571 | A1 * | 11/2010 | El-Saban | H04N 21/21805 375/240.01 |
| 2010/0309237 | A1 * | 12/2010 | Roh | G06F 3/1431 345/691 |
| 2011/0134997 | A1 * | 6/2011 | Narimatsu | H04N 19/172 375/240.03 |
| 2011/0194033 | A1 * | 8/2011 | Funada | G09G 5/006 348/739 |
| 2011/0310956 | A1 * | 12/2011 | Lin | H04N 21/44004 375/240.02 |
| 2012/0206610 | A1 * | 8/2012 | Wang | H04N 17/004 348/184 |
| 2013/0021352 | A1 * | 1/2013 | Wyatt | G09G 5/395 345/520 |
| 2013/0058398 | A1 * | 3/2013 | Jiang | H04N 19/152 375/240.03 |
| 2013/0258163 | A1 * | 10/2013 | Kachi | H04N 5/369 348/343 |
| 2013/0336412 | A1 * | 12/2013 | Erofeev | G11B 27/031 375/240.28 |
| 2014/0104365 | A1 * | 4/2014 | Haugen | H04M 3/567 348/14.07 |
| 2014/0201324 | A1 * | 7/2014 | Zhang | H04L 65/4084 709/217 |
| 2014/0270371 | A1 * | 9/2014 | Schilffarth | G06T 7/20 382/103 |
| 2015/0092109 | A1 * | 4/2015 | Mo | H04N 21/4394 348/584 |

* cited by examiner

DYNAMIC ADJUSTMENT OF VIDEO FRAME SAMPLING RATE

CROSS REFERENCE TO RELATED PATENT APPLICATION

The present disclosure claims the priority benefit of U.S. Provisional Patent Application No. 62/078,586, filed on 12 Nov. 2014, and U.S. Provisional Patent Application No. 62/160,103, filed on 12 May 2015, which are incorporated by reference in their entirety.

TECHNICAL FIELD

The present disclosure is generally related to video processing and, more particularly, to dynamic adjustment of video frame sampling rate.

BACKGROUND

Unless otherwise indicated herein, approaches described in this section are not prior art to the claims listed below and are not admitted to be prior art by inclusion in this section.

When data, whether transmitted in frames or packets, is transmitted from one device to another, difference in the sampling rates of the two devices may result in frames or packets not sampled, and thus dropped, on the receiving end. For instance, in the context of Wi-Fi display, in which the same multimedia content (e.g., video) may be displayed, played or otherwise presented by a source device (e.g., a smartphone) and streamed via Wi-Fi to a sink device (e.g., a television) to be also displayed, played or otherwise presented by the sink device, a difference in the sampling rates between the transmitting end and the receiving end may cause a phase shift that result in quality loss and poor user experience.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one example implementation, a method may involve receiving a first video signal comprising a first plurality of video frames and determining a frame rate of the first plurality of video frames. The method may also involve adjusting a sampling rate according to the determined frame rate of the first plurality of video frames. The method may further involve sampling the first plurality of video frames at the adjusted sampling rate. The method may additionally involve generating a second video signal comprising a second plurality of video frames based on the sampled first plurality of video frames.

In another example implementation, a method may involve determining a frame rate of a first plurality of video frames in a first video signal received from a first module by a second module. The first module may operate according to a first clock and the second module may operate according to a second clock independent of the first clock. The method may also involve adjusting, by the second module, a sampling rate according to the determined frame rate of the first plurality of video frames. The method may also involve sampling, by the second module, the first plurality of video frames at the adjusted sampling rate. The method may further involve generating, by the second module, a second video signal comprising a second plurality of video frames based on the sampled first plurality of video frames. The method may additionally involve transmitting, by the second module, the second video signal wirelessly to a third module.

In yet another example implementation, an apparatus may include a first module and a second module. The first module may be configured to transmit a first video signal comprising a first plurality of video frames. The second module may be configured to receive the first video signal from the first module, determine a frame rate of the first plurality of video frames, and adjust a sampling rate according to the determined frame rate of the first plurality of video frames, sample the first plurality of video frames at the adjusted sampling rate, and generate a second video signal comprising a second plurality of video frames based on the sampled first plurality of video frames.

Accordingly, implementations in accordance with the present disclosure may detect a real input frame rate and dynamically adjust the sampling rate according to the input frame rate. The proposed technique may improve quality, for example, for videos played by a second module (e.g., a television) mirrored from videos played by a first module (e.g., a mobile/portable apparatus such as a smartphone).

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
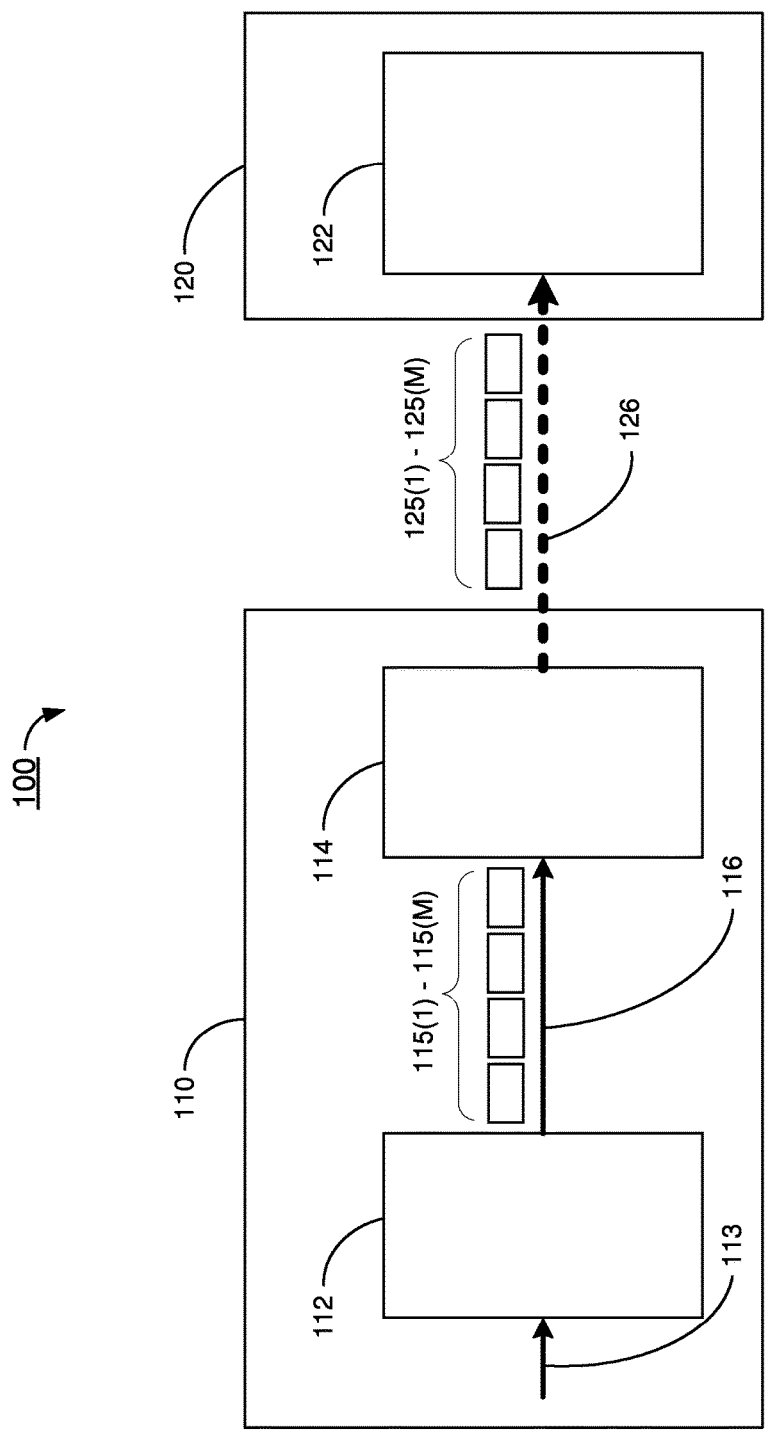
FIG. 1 is a diagram of an example environment in which various implementations in accordance with the present disclosure may be applied.

FIG. 1 illustrates an example environment 100 in which various implementations in accordance with the present disclosure may be applied. Environment 100 may include a first apparatus 110 and a second apparatus 120. Each of first apparatus 110 and second apparatus 120 may be an electronic apparatus. For example, first apparatus 110 may be a mobile device, e.g., a cell phone, second apparatus 120 may be a television or any apparatus capable of displaying. First apparatus 110 may include a first module 112 and a second module 114, and second apparatus 120 may include a third module 122. Each of first module 112, second module 114 and third module 122 may be hardware (circuitry or any device), software, or a combination of both. Each of first module 112 and second module 114 may be equipped or programmed with a respective internal clock independent of each other. That is, first module 112 may operate based on a first clock therein and second module 114 may operate based on a second clock therein which is independent of the first clock. In environment 100, first apparatus 110 may transmit a second signal 126 (e.g., video signal) to second apparatus 120. For instance, first apparatus 110 may transmit second signal 126 to second apparatus 120 wirelessly, e.g., via WiFi, Bluetooth, near field communication (NFC), infrared, or another wireless technology. In some embodiments, second module 114 may mirror a first signal 116 (e.g., a video signal) provided by first module 110 by sampling the first signal 116 to generate second signal 126. To minimize or mitigate quality loss in second apparatus 120 due to phase shift caused by the different sampling rates, a number of novel features may be applied in implementations in accordance with the present disclosure as described below.

In first apparatus 110, first module 112 may receive data 113 (e.g., video or multimedia data) to generate and output the first signal 116 (e.g., video signal) which is received by second module 114. In one embodiment, first apparatus 110 may generate digital signals and second apparatus 120 may collect the digital signals. The digital signals may include, for example and not limited to, a video signal, which may include one or more user interface (UI) layers, video data, or a composition of both. In generating first signal 116, first module 112 may attach information that allows second module 114 to detect the rate of data transmission. As an example for illustrative purpose, in the context of video signals containing video frames, first module 112 may attach temporal information such as a timestamp (e.g., presentation timestamp) to each video frame in generating first signal 116. Second module 114 may detect, obtain or otherwise determine a real input frame rate of first signal 116, e.g., by detecting first signal 116, and may adjust a sampling rate of first signal 116 according to the determined real input frame rate of first signal 116. For instance, second module 114 may increase, decrease or maintain its sampling rate according to the real input frame rate. In one embodiment, a default sampling rate may be implemented to be a specific value. For example, the rate of 30 fps may be implemented, which may often be frame rates of most video signals. Accordingly, a sampling rate may be increased to be higher than the specific value according to the real input frame rate of first signal 116. It is noted that the adjusted sampling rate is preferably no lower or higher than the real input frame rate of first signal 116. In some embodiments, to prevent any frames of the first signal 116 from being missed or dropped, the adjusted sampling rate may be multiples of the real input frame rate of first signal 116. For example, the adjusted sampling rate may be two times of the real input frame rate of first signal 116 (e.g., 60 fps when the real input frame rate is 30 fps). Second module 114 may sample first signal 116 using the adjusted sampling rate and generate second signal 126 which is transmitted, via wire(s) or wirelessly, to third module 122 in second apparatus 120. As video signals, first signal 116 may include or otherwise represent a number of video frames 115(1)-115(M) and second signal 126 may include or otherwise represent a number of video frames 125(1)-125(N), where M and N are positive integers greater than 1 and M is greater than or equal to N.

For illustrative purpose, in a non-limiting implementation in an Android system, the example environment may be MiraCast or WiFi Display. For example, first apparatus 110 may be a mobile device, e.g., a cellphone, and second apparatus 120 may be a television. First module 112 may include NuplayerRenderer and SurfaceFlinger for providing a first video signal 116. Timestamp information may be attached to the first video signal. Second module 114 may include SurfaceMediaSource and RepeaterSource for mirroring the video signal to generate a second video signal 126. A frame rate detector may be added to second module 114 or in a data transmission path between first module 112 and second module 114 for detecting the real input frame rate of first video signal 116 based on the timestamp information. First apparatus 110 or second module 114 may further include Mediapuller and a converter. It is noted that the present disclosure is not limited to Android system and may be applied to any other systems.

In the example above, as first module 112 may provide timestamps of first signal 116 when outputting first signal 116, second module 114 may detect the timestamps of first signal 116 when determining the frame rate of first signal 116. When adjusting the sampling rate according to the frame rate, second module 114 may calculate the frame rate of first signal 116s by, for example, using time values recorded in the respective timestamps of video frames 115(1)-115(M). In some embodiments, second module 114 may pick appropriate frames when calculating the frame rate of first signal 116. For example, it is possible that there may be one or more abnormal or irregular frames among video frames 115(1)-115(M) having a time value recorded in the respective timestamp being too large or too small compared to time values recorded in timestamps of adjacent frame(s). Second module 114 may ignore or otherwise omit such abnormal or irregular frame(s) when calculating the frame rate of first signal 116. Nevertheless, such abnormal or irregular frame(s) may still be provided to stage(s) subsequent a frame rate detection stage of second module 114.

Second module 114 may perform a smoothing process in generating second signal 126 so that second signal 126 may be generated with a relatively smoother frame rate. For instance, second module 114 may utilize a low-pass filter in generating second signal 126. Otherwise, it is possible that an abrupt change in the frame rate of second signal 126 may occur during a step change or abrupt transition when the frame rate of first signal 116 varies over time.

In generating second signal 126, second module 114 may, according to the timestamps, choose appropriate ones of video frames 115(1)-115(M) of first signal 116 and omit unwanted and/or redundant one(s) of video frames 115(1)-115(M) of first signal 116. Thus, one or more of video frames 115(1)-115(M) in first signal 116 may not have corresponding frame(s) among video frames 125(1)-125(N) in second signal 126. For instance, in an event that among video frames 115(1)-115(M) there are two video frames corresponding to the same time value recorded in respective timestamps, one of the two video frames may be omitted by second module 114 and thus not outputted to third module 122 by second module 114. Such omitted video frame(s) may be an indication of a small change of a user interface such as, for example, scrolling of a scroll bar by a user in the context of Wi-Fi display where first apparatus 110 may be a smartphone and second apparatus 120 may be a television.

Moreover, in generating video frames 125(1)-125(N) of second signal 126, second module 114 may remark or otherwise modify the respective timestamp of one or more of video frames 115(1)-115(M). That is, time values recorded in timestamps of video frames 115(1)-115(M) of first signal 116 may be different from time values recorded in timestamps of video frames 125(1)-125(N) of second signal 126. The time values recorded in timestamps of video frames 125(1)-125(N) of second signal 126 may be used by third module 122, for example, for displaying videos according to second signal 126.

Figure 2:
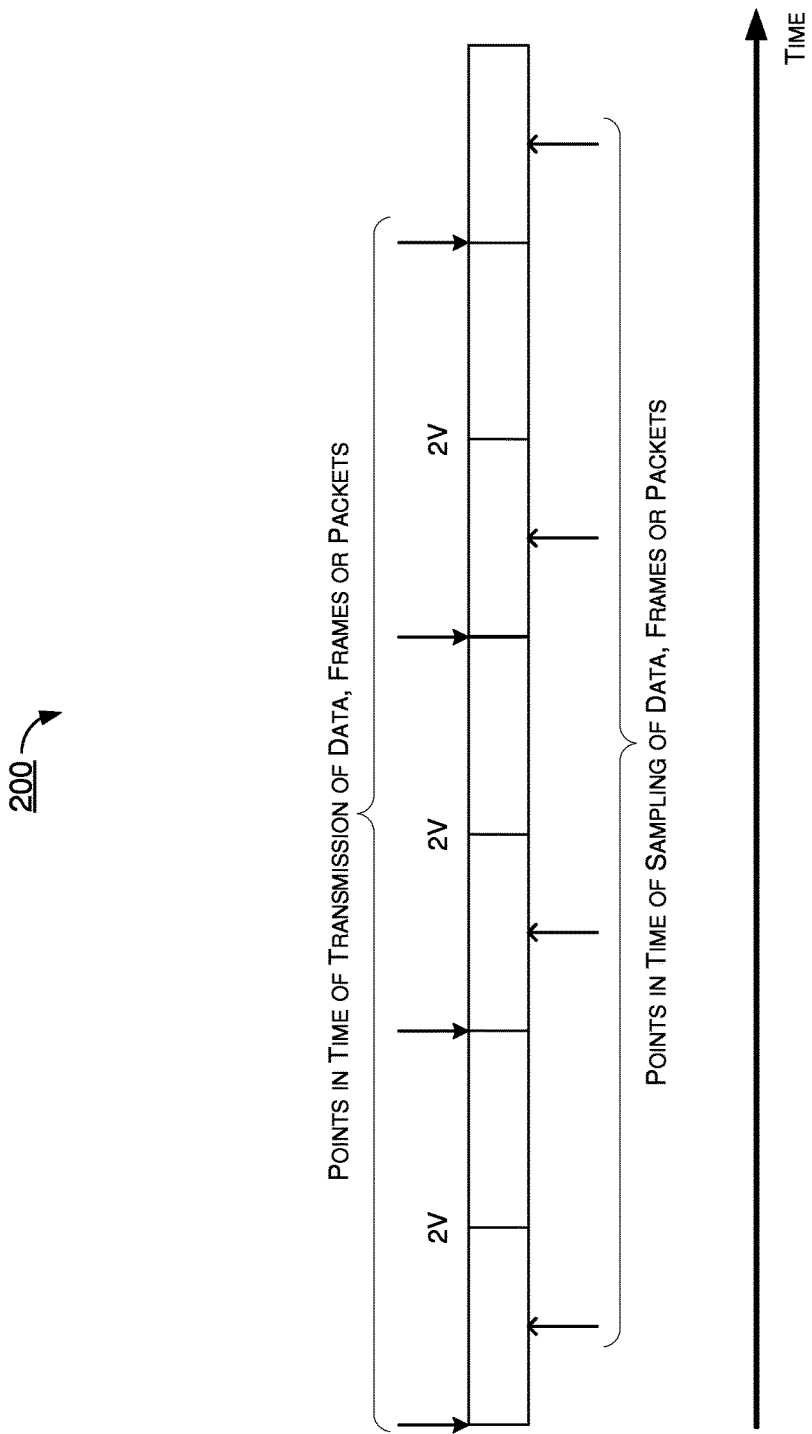
FIG. 2 is a timing diagram of an example ideal scenario of sampling with respect to transmission.

FIG. 2 illustrates an example ideal scenario 200 of sampling with respect to transmission. In ideal scenario 200, there are a number of points in time at which transmission of data, frames or packets occurs such as, for example, the points in time at which first module 110 transmits video frames 115(1)-115(M). There are also a number of points in time at which sampling of data, frames or packets occurs such as, for example, the points in time at which second module 120 samples video frames 115(1)-115(M) transmitted by first module 110. In ideal scenario 200, each point in time at which second module 120 samples one or more frames of video frames 115(1)-115(M) is after a corresponding point in time at which first module 110 transmits the corresponding one or more frames of video frames 115(1)-115(M) and before the subsequent point in time at which first module 110 transmits subsequent one or more frames of video frames 115(1)-115(M). Ideal scenario 200 represents a situation achievable with the proposed technique of the present disclosure in various implementations.

Figure 3:
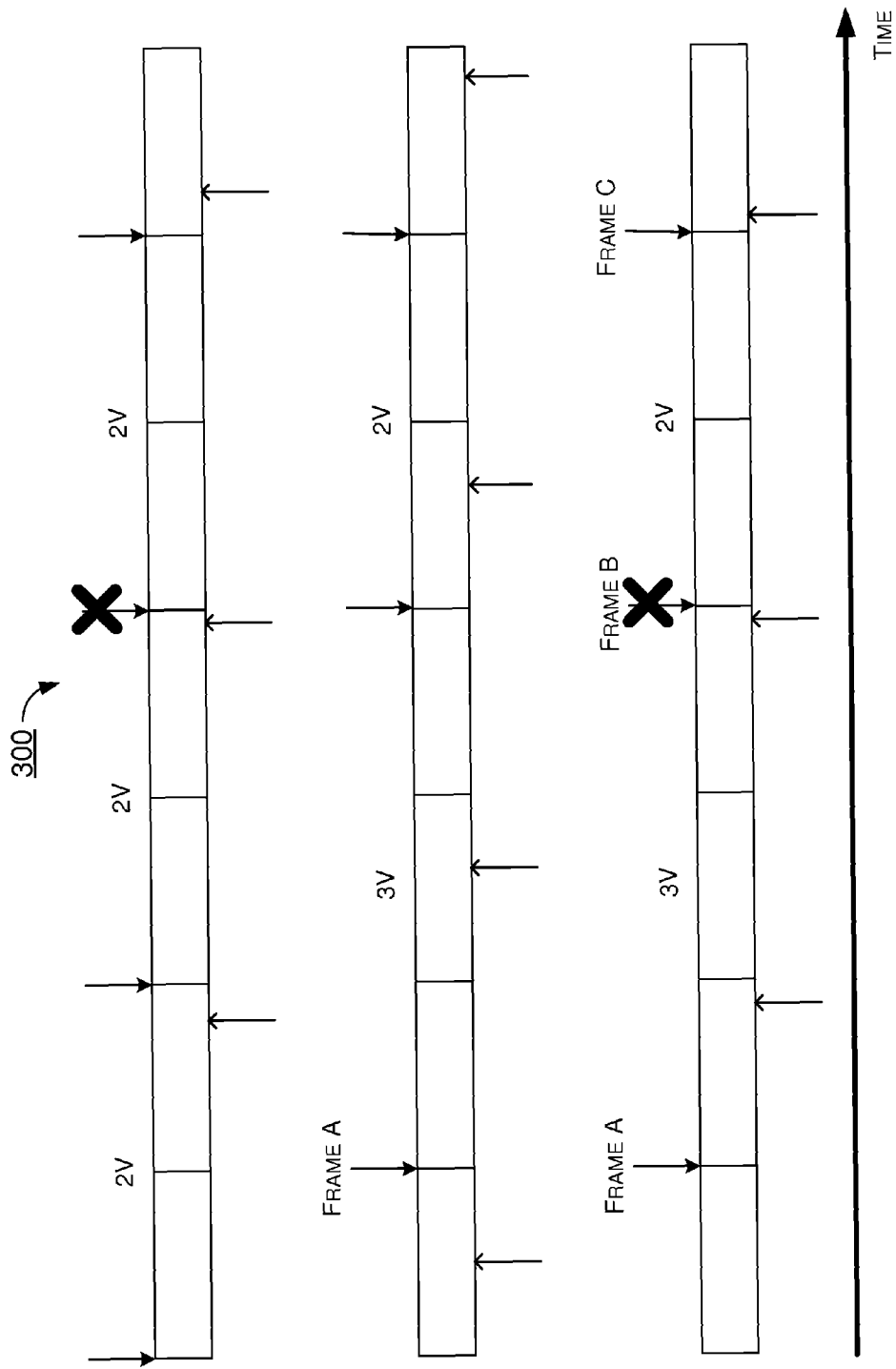
FIG. 3 is a timing diagram of an example scenario of sampling with respect to transmission.

FIG. 3 illustrates an example scenario 300 of sampling with respect to transmission without applying implementations in accordance with the present disclosure. In scenario 300, similar to ideal scenario 200, each of the downward-pointing arrows represents a point in time at which transmission of one or more video frames occurs, and each of the upward-pointing arrows represents a point in time at which sampling of one or more video frames occurs. In scenario 300, each of the two cross signs "X" represents a frame that is accidentally missed and thus not sampled. For instance, as shown in FIG. 3, although frame A is sampled frame B is missed. Scenario 300 represents a situation that implementations in accordance with the present disclosure can help avoid.

For convenience of explanation, in one example, the frame rate of first video signal 116 may be 32 fps and the frame rate of second video signal 126 may be also 32 fps in the example shown in FIG. 3. In addition, a default sampling rate may be 30 fps, which is lower than the frame rate of the first video signal 116. As shown in FIG. 3, the example scenario 300 is composed of three patterns from top to bottom, which may occur at different times for the same first video signal 116. The frame rate of the first video signal 116 is 2V (where "V" denotes a period of a Vsync signal and 2V can correspond to a frame rate of 32 fps), as shown in the top pattern. However, the frame rate of the first video signal 116 is unstable and its period may occasionally become 3V (corresponding to a frame rate of 24 fps), as shown in the middle and bottom patterns. In the top pattern, one frame is undesirably missed or dropped as show in FIG. 3. In addition, due to unstableness of the frame rate of the first video signal 116, frame B is dropped again in the bottom pattern as shown in FIG. 3.

Figure 4:
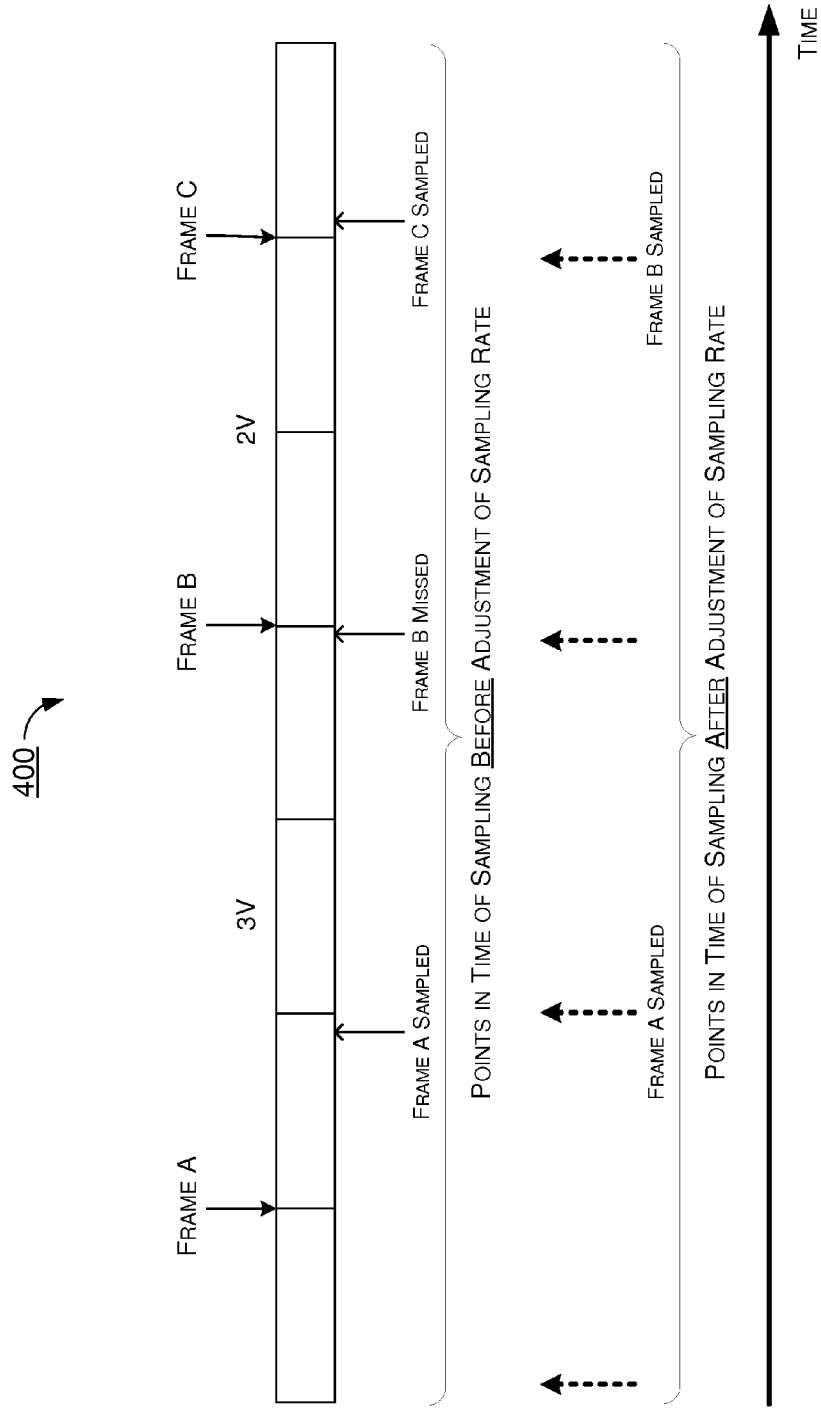
FIG. 4 is a diagram of an example scenario of sampling without and with adjustment in sampling rate in accordance with an implementation of the present disclosure.

FIG. 4 illustrates an example scenario 400 of sampling without and with adjustment in sampling rate in accordance with an implementation of the present disclosure. In scenario 400, as with scenario 300, each of the downward-pointing arrows represents a point in time at which transmission of one or more video frames occurs, and each of the upward-pointing arrows represents a point in time at which sampling of one or more video frames occurs. In particular, those upward-pointing arrows represent points in time at which sampling of video frames occurs before adjustment of the sampling rate. In the example shown in FIG. 4, the frame rate of first video signal 116 may be 32 fps and the frame rate of second video signal 126 may be also 32 fps. In addition, an unadjusted sampling rate may be 30 fps, which is lower than the frame rate of the first video signal 116. Although frames A and C are sampled under the unadjusted sampling rate, frame B is missed. Also shown in FIG. 4, with adjusted sampling rate to be higher than the frame rate of the first video signal 116, frame A and frame B are sampled without being missed.

Figure 5:
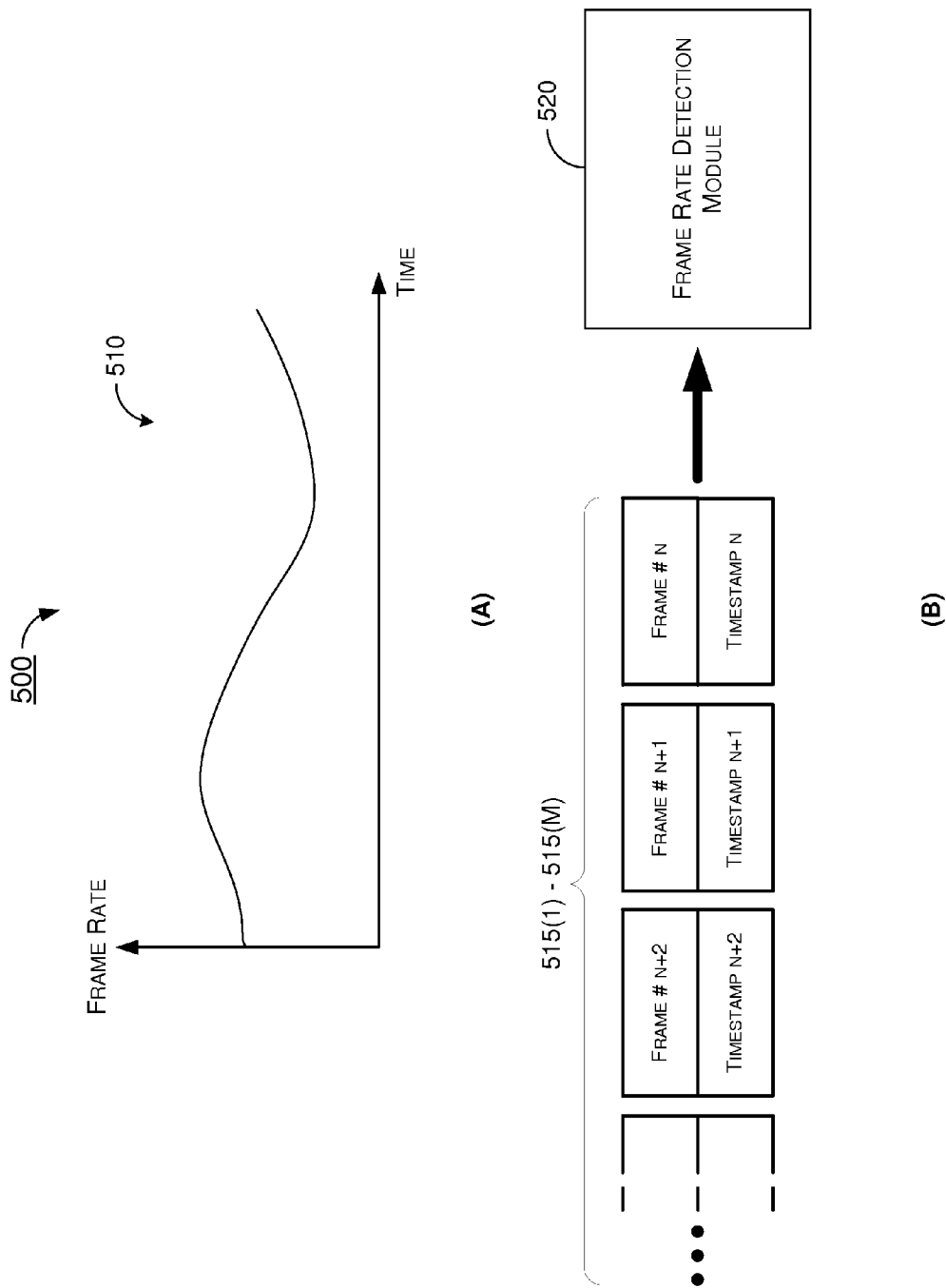
FIG. 5 is a diagram of an example framework of frame rate detection in accordance with an implementation of the present disclosure.

FIG. 5 illustrates an example framework 500 of frame rate detection in accordance with an implementation of the present disclosure. Part (A) of FIG. 5 includes a chart 510 that shows an example curve of frame rate over time after the frame rate has been smoothed out in accordance with the present disclosure. Part (B) of FIG. 5 includes a frame rate detection module 520 in accordance with the present disclosure. Frame rate detection module 520 may be configured to determine a frame rate of video frames 515(1)-515(M), with M being a positive integer greater than 1. In the example shown in FIG. 5, each of video frames 515(1)-515(M) may include or be appended with information that may be used by frame rate detection module 520 to detect, obtain or otherwise determine the frame rate of video frames 515(1)-515(M). For instance, as shown in FIG. 5, each of video frames 515(1)-515(M) may include or be appended with a timestamp based on which frame rate detection module 520 may determine the frame rate of video frames 515(1)-515(M). Specifically, frame rate detection module 520 may calculate the frame rate of video frames 515(1)-515(M) using time values recorded in the timestamps.

Figure 6:
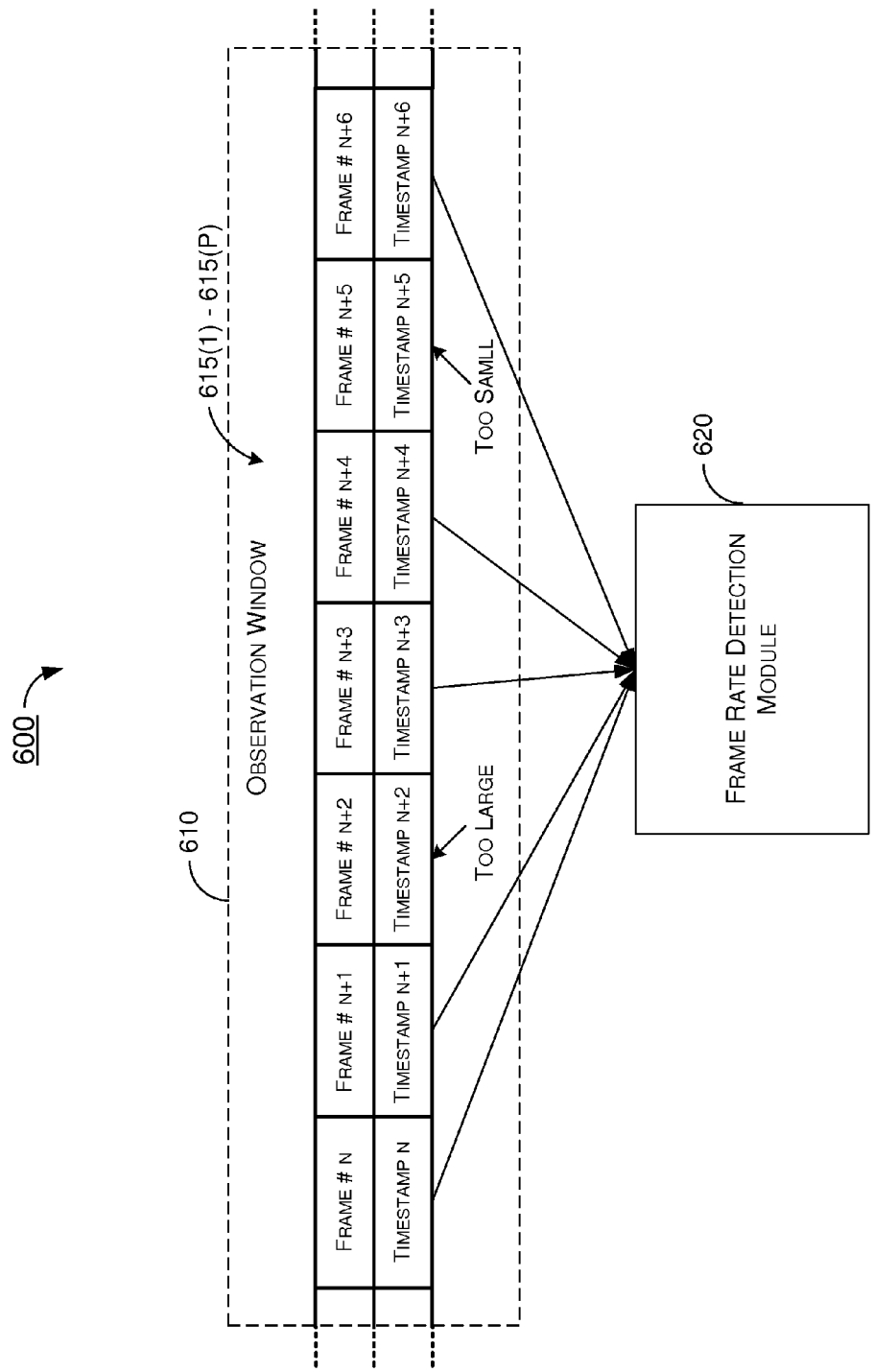
FIG. 6 is a diagram of an example scenario of frame rate detection in accordance with an implementations of the present disclosure.

FIG. 6 illustrates an example scenario 600 of frame rate detection in accordance with an implementations of the present disclosure. In scenario 600, a frame rate detection module 620, which may be similar or identical to frame rate detection module 620 in capability and functionality, may observe a subset of video frames out of a stream of video frames at a time. In the example shown in FIG. 6, an observation window 610 of frame rate detection module 620 includes frame rate detection module 620 may include a number of video frames 615(1)-615(P), with P being a positive integer greater than 1. As with frame rate detection module 520, frame rate detection module 620 may calculate the frame rate of video frames 615(1)-615(P) using time values recorded in the timestamps. In calculating the frame rate of video frames 615(1)-615(P), frame rate detection module 620 may omit one or more abnormal or irregular frames of video frames 615(1)-615(P) in performing the calculation. A video frame may be considered an abnormal or irregular frame that has a time value recorded in a respective timestamp which is different from a time value recorded in a respective timestamp associated with adjacent video frame(s) by more than a certain threshold amount. As an example, in scenario 600, frame #n+2 of video frames 615(1)-615(P) may be considered an abnormal or irregular frame because the time value of its associated timestamp is too large as it differs from the time value of the associated timestamp of frame #n+1 or frame #n+3 of video frames 615(1)-615(P) by a difference greater than a high threshold. As another example, in scenario 600, frame #n+5 of video frames 615(1)-615(P) may be considered an abnormal or irregular frame because the time value of its associated timestamp is too small as it differs from the time value of the associated timestamp of frame #n+4 or frame #n+6 of video frames 615(1)-615(P) by a difference less than a low threshold.

Figure 7:
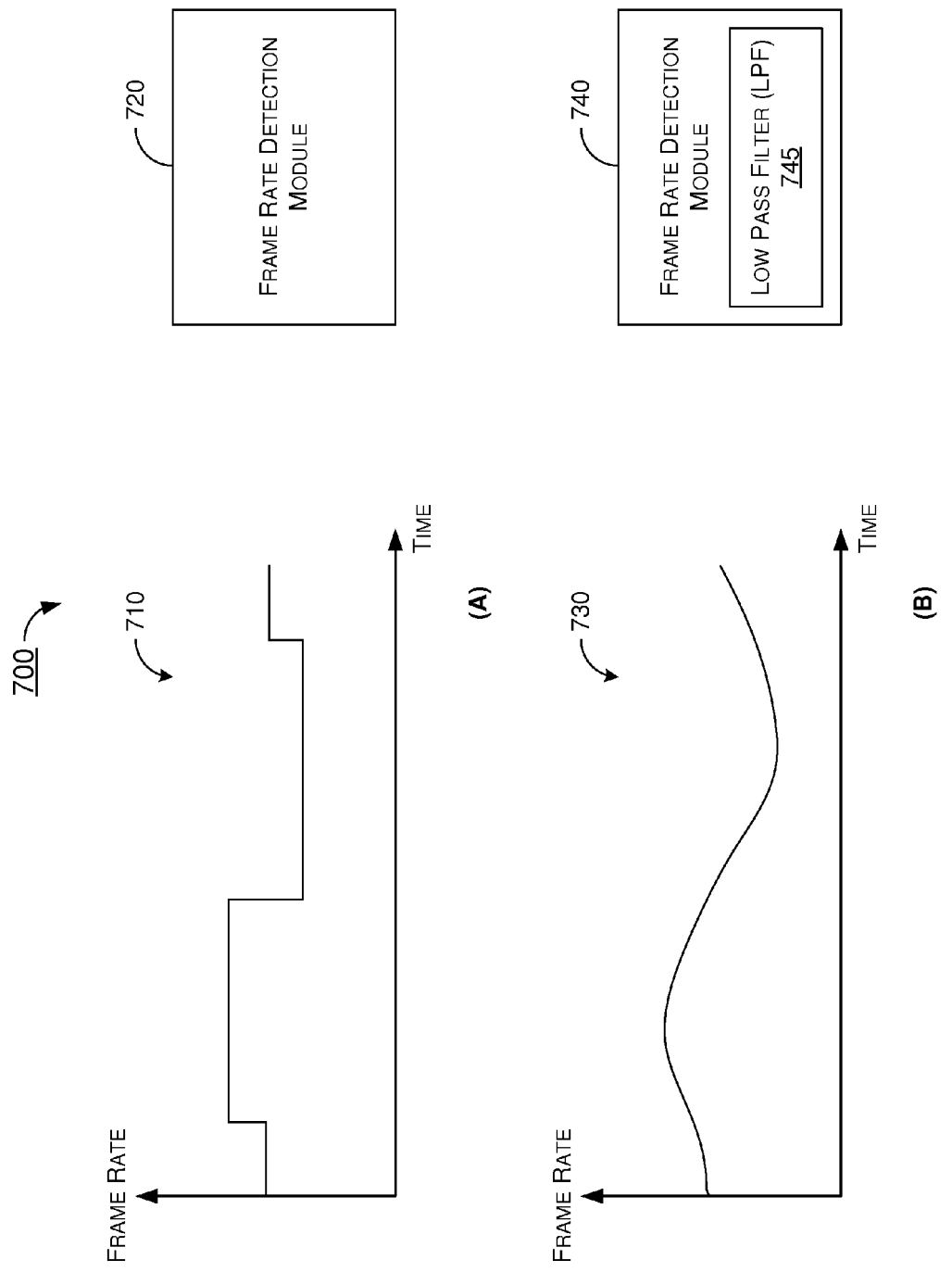
FIG. 7 is a diagram of an example scenario of frame rate detection without and with a smoothing process in accordance with an implementation of the present disclosure.

FIG. 7 illustrates an example scenario 700 of frame rate detection without and with a smoothing process in accordance with an implementation of the present disclosure. Part (A) of FIG. 7 includes a chart 710 that shows an example curve of frame rate over time as seen by a frame rate detection module 720, which does not have a smoothing function to smooth out the frame rate. Part (B) of FIG. 7 includes a chart 730 that shows an example curve of frame rate over time as seen by a frame rate detection module 740 in accordance with the present disclosure, which includes a smoothing function to smooth out the frame rate. Frame rate detection module 740 may be similar or identical to frame rate detection module 520 and frame rate detection module 620 in capability and functionality. As shown in FIG. 7, frame rate detection module 740 may include a low pass filter (LPF) 745 in accordance with the present disclosure. Low pass filter 745 may be configured to filter a video signal.

Figure 8:
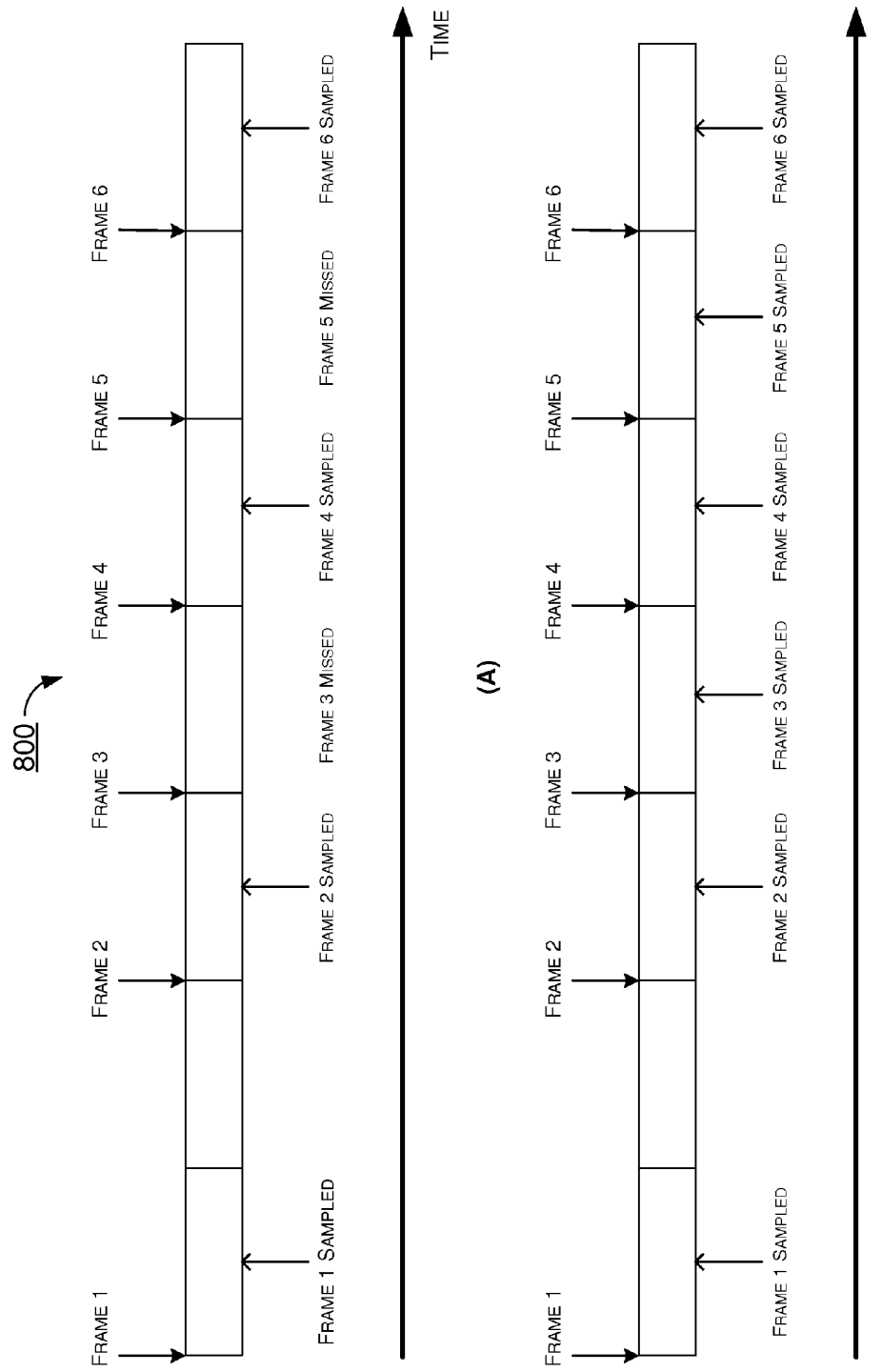
FIG. 8 is a timing diagram of an example scenario showing improvement in sampling with adjustment in sampling rate in accordance with an implementation of the present disclosure.

FIG. 8 illustrates an example scenario 800 showing improvement in sampling with adjustment in sampling rate in accordance with an implementation of the present disclosure. Part (A) of FIG. 8 includes a timing diagram showing sampling with respect to transmission without dynamic adjustment of frame sampling rate. As shown in FIG. 8, some frames (e.g., frame 3 and frame 5) may be missed due to phase shift. Part (B) of FIG. 8 includes a timing diagram showing sampling with respect to transmission with dynamic adjustment of frame sampling rate in accordance with the present disclosure. As shown in FIG. 8, each frame is sampled without a miss.

Example Implementations

Figure 9:
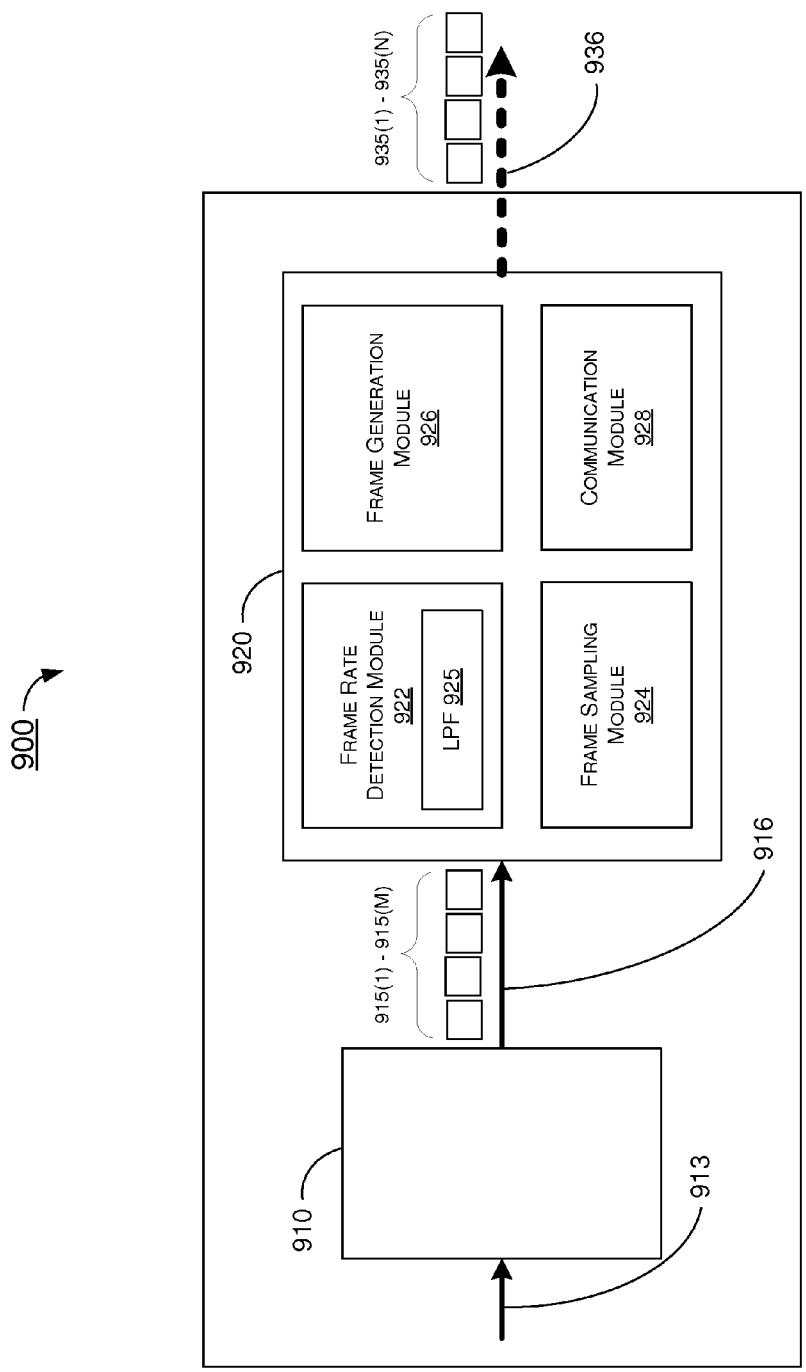
FIG. 9 is a simplified block diagram of an example apparatus in accordance with an implementation of the present disclosure.

FIG. 9 illustrates an example apparatus 900 in accordance with implementations of the present disclosure. Apparatus 900 may perform various functions to implement techniques, methods and systems described herein, including those described above as well as processes 1000 and 1100 described below. Apparatus 900 may be an example implementation of apparatus 110. In some implementations, apparatus 900 may be an electronic apparatus which may be a computing apparatus, a portable apparatus or a wearable apparatus. For instance, apparatus 900 may be a smartphone, a computing device such as a tablet computer, a laptop computer, a notebook computer, or a wearable device. In some implementations, apparatus 900 may be in the form of a single integrated-circuit (IC) chip, multiple IC chips or a chipset. Apparatus 900 may include at least those components shown in FIG. 9, such as a first module 910 and a second module 920. First module 910 and second module 920 may be implemented as separate and discrete IC chips or as a single IC chip. For illustrative purpose without limiting the scope of the present disclosure, description of apparatus 900 below is provided in the context of dynamic adjustment of video frame sampling rate.

First module 910 may be configured to receive data 913 (e.g., video or multimedia data) to generate and output a first video signal 916 which is received by second module 920. First video signal 916 may include or otherwise represent a number of video frames 915(1)-915(M), with M being a positive integer greater than 1. Second module 920 may be configured to receive first video signal 916 and perform a number of operations with respect to first video signal 916. Specifically, second module 920 may determine a frame rate of video frames 915(1)-915(M), adjust a sampling rate (if necessary) according to the determined frame rate of video frames 915(1)-915(M), sample video frames 915(1)-915(M) at the adjusted sampling rate, and generate a second video signal 936 based on the sampled video frames 915(1)-915(M). Second video signal 936 may include or otherwise represent a number of video frames 935(1)-935(N), with N being a positive integer greater than 1 and less than or equal to M.

In some implementations, second module 920 may include a frame rate detection module 922, a frame sampling module 924, a frame generation module 926 and a communication module 928. Each of frame rate detection module 922, frame sampling module 924, frame generation module 926 and communication module 928 may be implemented in the form of hardware, software, middleware and/or firmware. At least one of frame rate detection module 922, frame sampling module 924, frame generation module 926 and communication module 928 may be implemented at least partially in hardware such as a circuit including one or more transistors, one or more diodes, one or more capacitors, one or more resistors, one or more capacitors and/or one or more memristors.

Frame rate detection module 922 may be configured to determine a frame rate of video frames 915(1)-915(M). Frame sampling module 924 may be configured to adjust a sampling rate (if necessary) according to the determined frame rate of video frames 915(1)-915(M) and sample video frames 915(1)-915(M) at the adjusted sampling rate. Frame generation module 926 may be configured to generate video frames 935(1)-935(N) of second video signal 936 based on the sampled video frames 915(1)-915(M). Communication module 928 may be configured to receive first video signal 916 via wire(s) or wirelessly. Communication module 928 may be also configured to transmit second video signal 936 via wire(s) or wirelessly.

In some implementations, when video frames 915(1)-915(M) of first video signal 916 are received by second module 920, communication module 928 may be configured to receive timestamps associated with video frames 915(1)-915(M). Accordingly, in determining the frame rate of video frames 915(1)-915(M), frame rate detection module 922 may be configured to detect, obtain or otherwise determine the frame rate of video frames 915(1)-915(M) based on the timestamps associated with video frames 915(1)-915(M). Additionally, in determining the frame rate of video frames 915(1)-915(M), frame rate detection module 922 may be further configured to calculate the frame rate of video frames 915(1)-915(M) using time values recorded in the timestamps. Moreover, in calculating the frame rate of video frames 915(1)-915(M), frame rate detection module 922 may be configured to omit one or more abnormal or irregular frames of video frames 915(1)-915(M) in performing the calculation. In some implementations, the abnormal or irregular frame(s) among video frames 915(1)-915(M) may include a video frame having a time value recorded in a respective timestamp that differs from a time value recorded in a respective timestamp associated with adjacent video frame(s) of video frames 915(1)-915(M) by a time difference greater than a first time threshold (e.g., high threshold) or less than a second time threshold (e.g., low threshold). The first time threshold may be greater than the second time threshold. That is, in an event that the time difference between the time value recorded in the timestamp of a given video frame and the time value recorded in the timestamp of its adjacent video frame is not within a range between the first time threshold and the second time threshold, the given video frame may be deemed by frame rate detection module 922 as an abnormal or irregular frame and thus omitted.

In some implementations, in adjusting the sampling rate according to the determined frame rate of video frames 915(1)-915(M), frame sampling module 924 may be configured to increase or decrease its sampling rate used in sampling video frames 915(1)-915(M).

In some implementations, frame rate detection module 922 may include a low pass filter 925. Accordingly, in determining the frame rate of video frames 915(1)-915(M), frame rate detection module 922 may be further configured to filter the second video signal using low pass filter 925.

In some implementations, in generating video frames 935(1)-935(N) of second video signal 936, frame generation module 928 may be configured to omit one of two video frames of video frames 935(1)-935(N) in response to time values recorded in respective timestamps associated with the two video frames being equal.

Alternatively or additionally, in generating video frames 935(1)-935(N) of second video signal 936 based on the sampled video frames 915(1)-915(M) of first video signal 916, frame generation module 928 may be configured to perform a number of operations. For instance, frame generation module 928 may modify a time value recorded in a respective timestamp associated with a first video frame of video frames 915(1)-915(M). Additionally, frame generation module 928 may also generate a second video frame of video frames 935(1)-935(N) based on the first video frame of video frames 915(1)-915(M). In this case, the time value recorded in a respective timestamp associated with the second video frame may be different from the time value recorded in the respective timestamp associated with the first video frame.

In some implementations, communication module 928 may be configured to transmit second video signal 936 wirelessly. For instance, communication module 928 may stream video frames 935(1)-935(N) wirelessly to a third module capable of displaying video frames 935(1)-935(N). Communication module 928 may be configured to employ any suitable wireless technology such as, for example, WiFi, Bluetooth, NFC, infrared, or another existing or yet-to-be-developed wireless technology.

Figure 10:
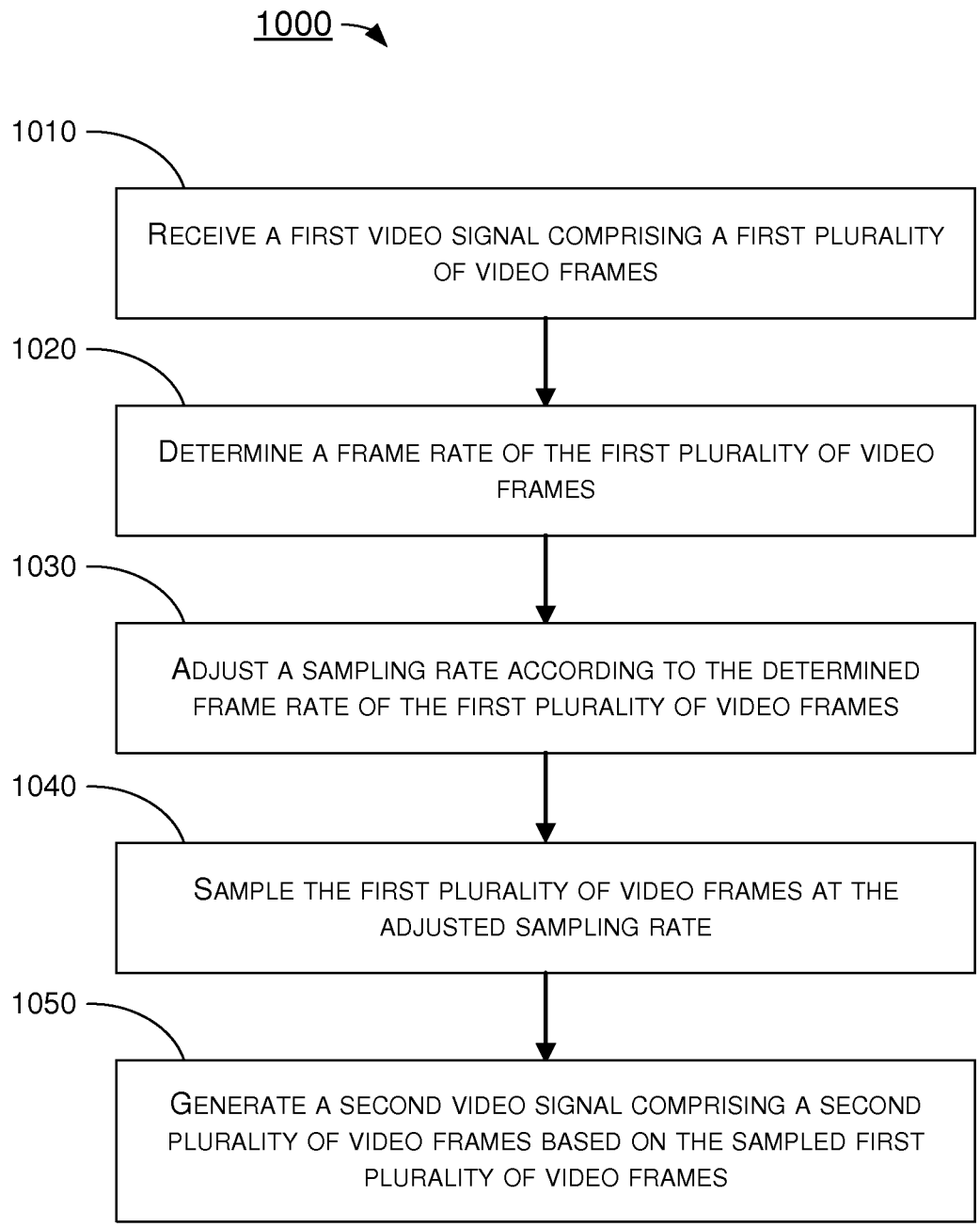
FIG. 10 is a flowchart of an example process in accordance with an implementation of the present disclosure.

FIG. 10 illustrates an example process 800 in accordance with an implementation of the present disclosure. Process 1000 may include one or more operations, actions, or functions as represented by one or more blocks such as blocks 1010, 1020, 1030, 1040 and 1050. Although illustrated as discrete blocks, various blocks of process 1000 may be divided into additional blocks, combined into fewer blocks, or eliminated, depending on the desired implementation. Process 1000 may be implemented by apparatus 110 and apparatus 900. Solely for illustrative purpose and without limiting the scope of the present disclosure, process 1000 is described below in the context of process 1000 being performed by apparatus 900. Process 1000 may begin at 1010.

At 1010, process 1000 may involve second module 920 receiving a first video signal comprising a first plurality of video frames from first module 910. Process 1000 may proceed from 1010 to 1020.

At 1020, process 1000 may involve second module 920 determining a frame rate of the first plurality of video frames. Process 1000 may proceed from 1020 to 1030.

At 1030, process 1000 may involve second module 920 adjusting a sampling rate according to the determined frame rate of the first plurality of video frames. Process 1000 may proceed from 1030 to 1040.

At 1040, process 1000 may involve second module 920 sampling the first plurality of video frames at the adjusted sampling rate. Process 1000 may proceed from 1040 to 1050.

At 1050, process 1000 may involve second module 920 generating a second video signal comprising a second plurality of video frames based on the sampled first plurality of video frames.

Process 1000 may involve additional operations. A description of examples of such operations of process 1000 is provided below.

In some implementations, in receiving the first video signal comprising the first plurality of video frames, process 1000 may also involve second module 920 receiving timestamps associated with the first plurality of video frames. In some implementations, in determining the frame rate of the first plurality of video frames, process 1000 may involve second module 920 determining the frame rate of the first plurality of video frames based on the timestamps associated with the first plurality of video frames. In some implementations, in determining the frame rate of the first plurality of video frames, process 1000 may further involve second module calculating the frame rate of the first plurality of video frames using time values recorded in the timestamps. In some implementations, in calculating the frame rate of the first plurality of video frames, process 1000 may involve second module 920 omitting an abnormal or irregular frame of the first plurality of video frames in the calculating. In some implementations, the abnormal or irregular frame of the first plurality of video frames may include a video frame of the first plurality of video frames having a time value recorded in a respective timestamp that differs from a time value recorded in a respective timestamp associated with an adjacent video frame of the first plurality of video frames by a time difference greater than a first time threshold or less than a second time threshold. The first time threshold may be greater than the second time threshold.

In some implementations, in adjusting the sampling rate according to the determined frame rate of the first plurality of video frames, process 1000 may involve second module 920 increasing the sampling rate used in sampling the first plurality of video frames. Alternatively or additionally, in adjusting of the sampling rate according to the determined frame rate of the first plurality of video frames, process 1000 may involve second module 920 adjusting the sampling rate to be higher than the determined frame rate of the first plurality of video frames.

In some implementations, in determining the frame rate of the first plurality of video frames, process 1000 may involve second module 920 filtering the second video signal using a low pass filter. Alternatively or additionally, in generating the second video signal comprising the second plurality of video frames, process 1000 may involve second module 920 omitting one of two video frames of the first plurality of video frames in response to time values recorded in respective timestamps associated with the two video frames being equal. Alternatively or additionally, in generating the second video signal comprising the second plurality of video frames based on the sampled first plurality of video frames, process 1000 may involve second module 920 performing a number of operations. For instance, process 1000 may involve second module 920 modifying a time value recorded in a respective timestamp associated with a first video frame of the first plurality of video frames. Moreover, process 1000 may also involve second module 920 generating a second video frame of the second plurality of video frames based on the first video frame of the first plurality of video frames. A time value recorded in a respective timestamp associated with the second video frame may be different from the time value recorded in the respective timestamp associated with the first video frame.

In some implementations, process 1000 may further involve second module 920 transmitting the second video signal wirelessly (e.g., to another apparatus similar or equivalent to apparatus 120). In some implementations, in transmitting the second video signal wirelessly, process 1000 may involve second module 920 streaming the second plurality of video frames wirelessly to a computing device capable of displaying the second plurality of video frames.

Figure 11:
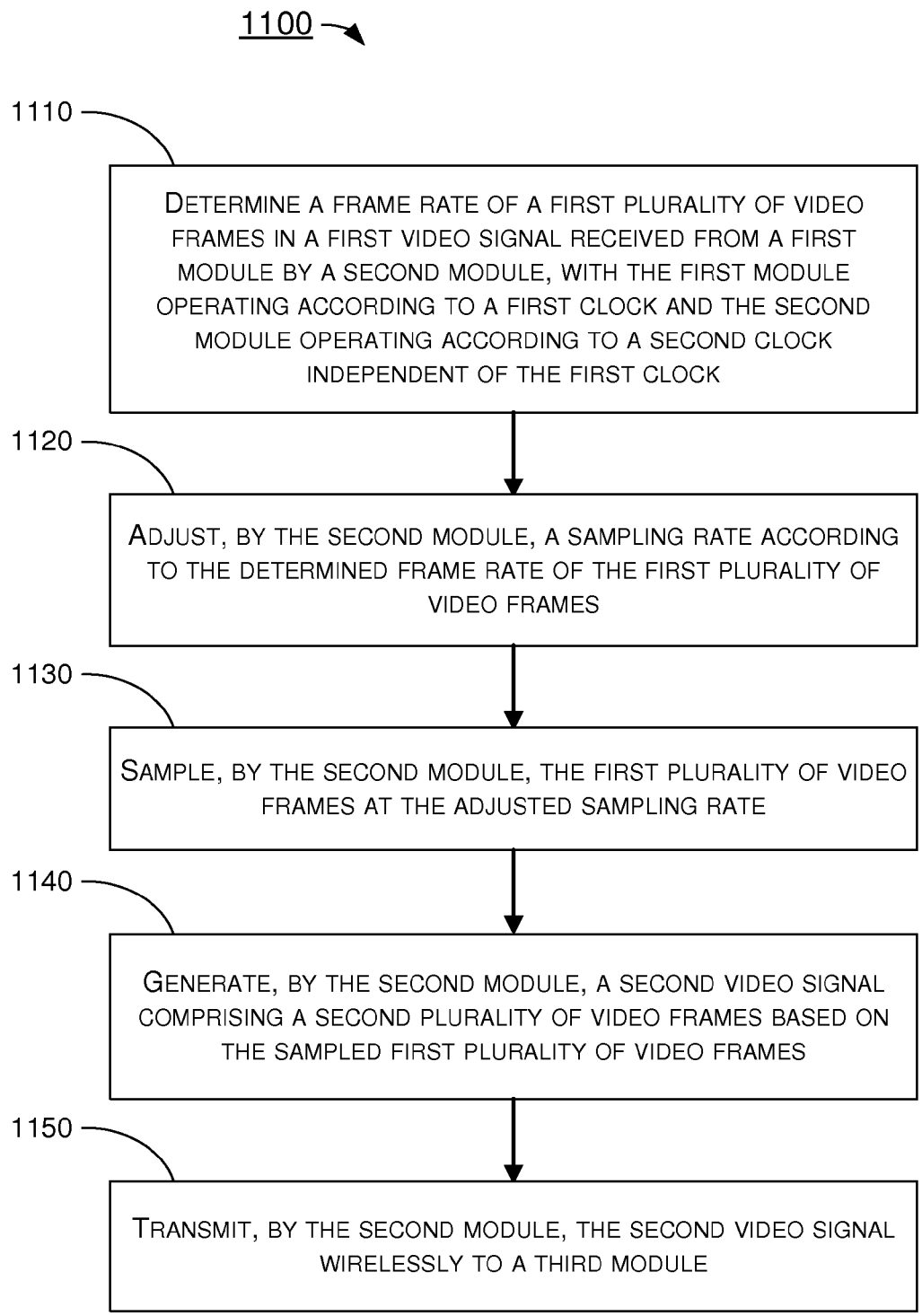
FIG. 11 is a flowchart of an example process in accordance with another implementation of the present disclosure.

FIG. 11 illustrates an example process 800 in accordance with an implementation of the present disclosure. Process 1100 may include one or more operations, actions, or functions as represented by one or more blocks such as blocks 1110, 1120, 1130, 1140 and 1150. Although illustrated as discrete blocks, various blocks of process 1100 may be divided into additional blocks, combined into fewer blocks, or eliminated, depending on the desired implementation. Process 1100 may be implemented by apparatus 110 and apparatus 900. Solely for illustrative purpose and without limiting the scope of the present disclosure, process 1100 is described below in the context of process 1100 being performed by apparatus 900. Process 1100 may begin at 1110.

At 1110, process 1100 may involve second module 920 determining a frame rate of a first plurality of video frames in a first video signal received from first module 910 by second module 920. First module 910 may operate according to a first clock and second module 920 may operate according to a second clock independent of the first clock. Process 1100 may proceed from 1110 to 1120.

At 1120, process 1100 may involve second module 920 adjusting a sampling rate according to the determined frame rate of the first plurality of video frames. Process 1100 may proceed from 1120 to 1130.

At 1130, process 1100 may involve second module 920 sampling the first plurality of video frames at the adjusted sampling rate. Process 1100 may proceed from 1130 to 1140.

At 1140, process 1100 may involve second module 920 generating a second video signal comprising a second plurality of video frames based on the sampled first plurality of video frames. Process 1100 may proceed from 1140 to 1150.

At 1150, process 1100 may involve second module 920 transmitting the second video signal wirelessly to a third module (e.g., a device similar or equivalent to third module 122 of second apparatus 120).

Process 1100 may involve additional operations. A description of examples of such operations of process 1100 is provided below.

In some implementations, process 1100 may also involve second module 920 receiving timestamps associated with the first plurality of video frames from first module 910. In some implementations, in determining the frame rate of the first plurality of video frames, process 1100 may involve second module 920 determining the frame rate of the first plurality of video frames based on the timestamps associated with the first plurality of video frames. Additionally, in determining the frame rate of the first plurality of video frames, process 1100 may also involve second module 920 calculating the frame rate of the first plurality of video frames using time values recorded in the timestamps. In some implementations, in calculating the frame rate of the first plurality of video frames, process 1100 may involve second module 920 omitting an abnormal or irregular frame of the first plurality of video frames in the calculating. In some implementations, the abnormal or irregular frame of the first plurality of video frames may include a video frame of the first plurality of video frames having a time value recorded in a respective timestamp that differs from a time value recorded in a respective timestamp associated with an adjacent video frame of the first plurality of video frames by a time difference greater than a first time threshold or less than a second time threshold. The first time threshold may be greater than the second time threshold.

In some implementations, in adjusting the sampling rate according to the determined frame rate of the first plurality of video frames, process 1100 may involve second module 920 increasing the sampling rate used in sampling the first plurality of video frames. The adjusted sampling rate may be different from a clock rate of the second clock. Alternatively or additionally, in adjusting of the sampling rate according to the determined frame rate of the first plurality of video frames, process 1100 may involve second module 920 adjusting the sampling rate to be higher than the determined frame rate of the first plurality of video frames.

In some implementations, in determining the frame rate of the first plurality of video frames, process 1100 may involve second module 920 filtering the second video signal using a low pass filter. Alternatively or additionally, in generating the second video signal comprising the second plurality of video frames, process 1100 may involve second module 920 omitting one of two video frames of the first plurality of video frames in response to time values recorded in respective timestamps associated with the two video frames being equal. Alternatively or additionally, in generating the second video signal comprising the second plurality of video frames based on the sampled first plurality of video frames, process 1100 may involve second module 920 performing a number of operations. For instance, process 1100 may involve second module 920 modifying a time value recorded in a respective timestamp associated with a first video frame of the first plurality of video frames. Moreover, process 1100 may involve second module 920 generating a second video frame of the second plurality of video frames based on the first video frame of the first plurality of video frames. A time value recorded in a respective timestamp associated with the second video frame may be different from the time value recorded in the respective timestamp associated with the first video frame.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving a first video signal comprising a first plurality of video frames from a first module by a second module, the first module operates according to a first clock and the second module operates according to a second clock independent of the first clock;
determining, by the second module, a frame rate of the first plurality of video frames;
adjusting, by the second module, a sampling rate according to the determined frame rate of the first plurality of video frames;
sampling, by the second module, the first plurality of video frames at the adjusted sampling rate; and
generating, by the second module, a second video signal comprising a second plurality of video frames based on the sampled first plurality of video frames;
wherein the determining of the frame rate of the first plurality of video frames comprises omitting an abnormal or irregular frame of the first plurality of video frames in calculating the frame rate of the first plurality of video frames using time values recorded in timestamps associated with the first plurality of video frames.

2. The method of claim 1, wherein the receiving of the first video signal comprising the first plurality of video frames further comprises receiving timestamps associated with the first plurality of video frames.

3. The method of claim 2, wherein the determining of the frame rate of the first plurality of video frames comprises determining the frame rate of the first plurality of video frames based on the timestamps associated with the first plurality of video frames.

4. The method of claim 3, wherein the determining of the frame rate of the first plurality of video frames further comprises calculating the frame rate of the first plurality of video frames using time values recorded in the timestamps.

5. The method of claim 1, wherein the abnormal or irregular frame of the first plurality of video frames comprises a video frame of the first plurality of video frames having a time value recorded in a respective timestamp that differs from a time value recorded in a respective timestamp associated with an adjacent video frame of the first plurality of video frames by a time difference greater than a first time threshold or less than a second time threshold, the first time threshold greater than the second time threshold.

6. The method of claim 1, wherein the adjusting of the sampling rate according to the determined frame rate of the first plurality of video frames comprises increasing the sampling rate used in sampling the first plurality of video frames.

7. The method of claim 1, wherein the adjusting of the sampling rate according to the determined frame rate of the first plurality of video frames comprises adjusting the sampling rate to be higher than the determined frame rate of the first plurality of video frames.

8. The method of claim 1, wherein the determining of the frame rate of the first plurality of video frames further comprises filtering the second video signal using a low pass filter.

9. The method of claim 1, wherein the generating of the second video signal comprising the second plurality of video frames comprises omitting one of two video frames of the first plurality of video frames in response to time values recorded in respective timestamps associated with the two video frames being equal.

10. The method of claim 1, wherein the generating of the second video signal comprising the second plurality of video frames based on the sampled first plurality of video frames comprises:
modifying a time value recorded in a respective timestamp associated with a first video frame of the first plurality of video frames; and
generating a second video frame of the second plurality of video frames based on the first video frame of the first plurality of video frames,
wherein a time value recorded in a respective timestamp associated with the second video frame is different from the time value recorded in the respective timestamp associated with the first video frame.

11. The method of claim 1, further comprising:
transmitting the second video signal wirelessly, wherein the transmitting of the second video signal wirelessly comprises streaming the second plurality of video frames wirelessly to a computing device capable of displaying the second plurality of video frames.

12. A method, comprising:
determining a frame rate of a first plurality of video frames in a first video signal received from a first module by a second module, the first module operating according to a first clock and the second module operating according to a second clock independent of the first clock;
adjusting, by the second module, a sampling rate according to the determined frame rate of the first plurality of video frames;
sampling, by the second module, the first plurality of video frames at the adjusted sampling rate;
generating, by the second module, a second video signal comprising a second plurality of video frames based on the sampled first plurality of video frames; and
transmitting, by the second module, the second video signal wirelessly to a third module;
wherein the determining of the frame rate of the first plurality of video frames comprises omitting an abnormal or irregular frame of the first plurality of video frames in calculating the frame rate of the first plurality of video frames using time values recorded in timestamps associated with the first plurality of video frames.

13. The method of claim 12, further comprising:
receiving, by the second module, timestamps associated with the first plurality of video frames from the first module.

14. The method of claim 13, wherein the determining of the frame rate of the first plurality of video frames comprises determining the frame rate of the first plurality of video frames based on the timestamps associated with the first plurality of video frames.

15. The method of claim 14, wherein the determining of the frame rate of the first plurality of video frames further comprises calculating the frame rate of the first plurality of video frames using time values recorded in the timestamps.

16. The method of claim 12, wherein the abnormal or irregular frame of the first plurality of video frames comprises a video frame of the first plurality of video frames having a time value recorded in a respective timestamp that differs from a time value recorded in a respective timestamp associated with an adjacent video frame of the first plurality of video frames by a time difference greater than a first time threshold or less than a second time threshold, the first time threshold greater than the second time threshold.

17. The method of claim 12, wherein the adjusting of the sampling rate according to the determined frame rate of the first plurality of video frames comprises increasing the sampling rate used in sampling the first plurality of video frames, the adjusted sampling rate is different from a clock rate of the second clock.

18. The method of claim 12, wherein the adjusting of the sampling rate according to the determined frame rate of the first plurality of video frames comprises adjusting the sampling rate to be higher than the determined frame rate of the first plurality of video frames.

19. The method of claim 12, wherein the determining of the frame rate of the first plurality of video frames further comprises filtering the second video signal using a low pass filter.

20. The method of claim 12, wherein the generating of the second video signal comprising the second plurality of video frames comprises omitting one of two video frames of the first plurality of video frames in response to time values recorded in respective timestamps associated with the two video frames being equal.

21. The method of claim 12, wherein the generating of the second video signal comprising the second plurality of video frames based on the sampled first plurality of video frames comprises:
modifying a time value recorded in a respective timestamp associated with a first video frame of the first plurality of video frames; and
generating a second video frame of the second plurality of video frames based on the first video frame of the first plurality of video frames,
wherein a time value recorded in a respective timestamp associated with the second video frame is different from the time value recorded in the respective timestamp associated with the first video frame.

22. An apparatus, comprising:
a first module configured to output a first video signal comprising a first plurality of video frames; and
a second module configured to perform operations comprising:
receiving the first video signal from the first module;
determining a frame rate of the first plurality of video frames;
adjusting a sampling rate according to the determined frame rate of the first plurality of video frames;
sampling the first plurality of video frames at the adjusted sampling rate; and
generating a second video signal comprising a second plurality of video frames based on the sampled first plurality of video frames;
wherein the first module operates according to a first clock and the second module operates according to a second clock independent of the first clock; and wherein, in determining the frame rate of the first plurality of video frames, the second module is further configured to omit an abnormal or irregular frame of the first plurality of video frames in calculating the frame rate of the first plurality of video frames using time values recorded in timestamps associated with the first plurality of video frames.

23. The apparatus of claim 22, wherein, in receiving the first video signal comprising the first plurality of video frames, the second module is further configured to receive timestamps associated with the first plurality of video frames.

24. The apparatus of claim 23, wherein, in determining the frame rate of the first plurality of video frames, the second module is configured to determine the frame rate of the first plurality of video frames based on the timestamps associated with the first plurality of video frames.

25. The apparatus of claim 24, wherein, in determining the frame rate of the first plurality of video frames, the second module is further configured to calculate the frame rate of the first plurality of video frames using time values recorded in the timestamps.

26. The apparatus of claim 23, wherein, in adjusting of the sampling rate according to the determined frame rate of the first plurality of video frames, the second module is configured to adjust the sampling rate to be higher than the determined frame rate of the first plurality of video frames.

27. The apparatus of claim 22, wherein the abnormal or irregular frame of the first plurality of video frames comprises a video frame of the first plurality of video frames having a time value recorded in a respective timestamp that differs from a time value recorded in a respective timestamp associated with an adjacent video frame of the first plurality of video frames by a time difference greater than a first time threshold or less than a second time threshold, the first time threshold greater than the second time threshold.

28. The apparatus of claim 22, wherein, in adjusting the sampling rate according to the determined frame rate of the first plurality of video frames, the second module is configured to increase the sampling rate used in sampling the first plurality of video frames.

29. The apparatus of claim 22, wherein, in determining the frame rate of the first plurality of video frames, the second module is further configured to filter the second video signal using a low pass filter.

30. The apparatus of claim 22, wherein, in generating the second video signal comprising the second plurality of video frames, the second module is configured to omit one of two video frames of the first plurality of video frames in response to time values recorded in respective timestamps associated with the two video frames being equal.

31. The apparatus of claim 22, wherein, in generating the second video signal comprising the second plurality of video frames based on the sampled first plurality of video frames, the second module is configured to perform operations comprising:
modifying a time value recorded in a respective timestamp associated with a first video frame of the first plurality of video frames; and
generating a second video frame of the second plurality of video frames based on the first video frame of the first plurality of video frames,
wherein a time value recorded in a respective timestamp associated with the second video frame is different from the time value recorded in the respective timestamp associated with the first video frame.

32. The apparatus of claim 22, wherein the second module is further configured to transmit the second video signal wirelessly.

33. The apparatus of claim 32, wherein, in transmitting the second video signal wirelessly, the second module is configured to stream the second plurality of video frames wirelessly to a third module capable of displaying the second plurality of video frames.

34. An apparatus, comprising:
a first module configured to output a first video signal comprising a first plurality of video frames; and
a second module configured to perform operations comprising:
receiving the first video signal from the first module;
determining a frame rate of the first plurality of video frames;
adjusting a sampling rate according to the determined frame rate of the first plurality of video frames;
sampling the first plurality of video frames at the adjusted sampling rate; and
generating a second video signal comprising a second plurality of video frames based on the sampled first plurality of video frames;
wherein, in generating the second video signal comprising the second plurality of video frames based on the sampled first plurality of video frames, the second module is configured to perform operations comprising:
modifying a time value recorded in a respective timestamp associated with a first video frame of the first plurality of video frames; and
generating a second video frame of the second plurality of video frames based on the first video frame of the first plurality of video frames,
wherein a time value recorded in a respective timestamp associated with the second video frame is different from the time value recorded in the respective timestamp associated with the first video frame.

35. A method, comprising:
receiving a first video signal comprising a first plurality of video frames from a first module by a second module;
determining, by the second module, a frame rate of the first plurality of video frames;
adjusting, by the second module, a sampling rate according to the determined frame rate of the first plurality of video frames;
sampling, by the second module, the first plurality of video frames at the adjusted sampling rate; and
generating, by the second module, a second video signal comprising a second plurality of video frames based on the sampled first plurality of video frames;
wherein the generating of the second video signal comprising the second plurality of video frames based on the sampled first plurality of video frames comprises:
modifying a time value recorded in a respective timestamp associated with a first video frame of the first plurality of video frames; and
generating a second video frame of the second plurality of video frames based on the first video frame of the first plurality of video frames,
wherein a time value recorded in a respective timestamp associated with the second video frame is different from the time value recorded in the respective timestamp associated with the first video frame.

* * * * *